Jan. 18, 1927.
F. S. McCULLOUGH
1,615,022
METHOD OF APPLYING EARTHEN MATERIAL TO METAL
Filed Oct. 3, 1925
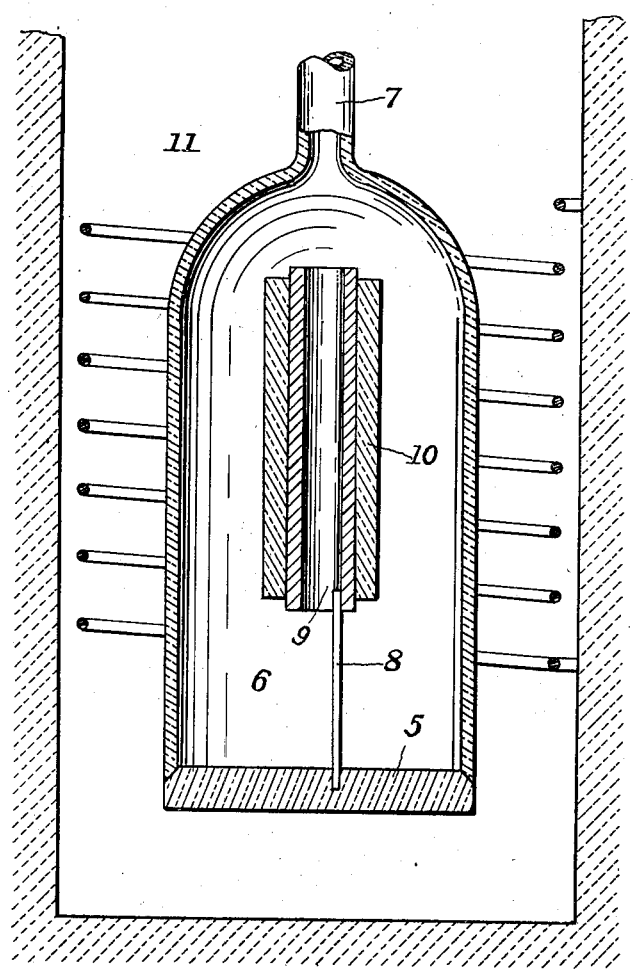
INVENTOR Patented Jan. 18, 1927.

1,615,022

UNITED STATES PATENT OFFICE.

FREDERICK S. McCULLOUGH, OF EDGEWOOD, PENNSYLVANIA.

METHOD OF APPLYING EARTHEN MATERIAL TO METAL.

Application filed October 3, 1925. Serial No. 60,199.

This invention relates to the manufacture of composite articles of earthen material and metal.

In my Patent No. 1,549,591 dated August 11, 1925, there is described a method for firing porcelain or other earthen material in a vacuum where the earthen material is contained within a metal shell.

According to the present invention it is proposed to apply earthen material to a metal body and then fire the article in a vacuum wherein proper heating of the earthen material is possible without oxidation of the metal.

The invention may be readily understood by reference to the accompanying drawings which illustrate more or less diagrammatically the present invention and to the details of which the invention is not restricted.

In the drawing, 5 designates a suitable base of a container 6 which may be connected to a vacuum pump and exhausted to a high degree of vacuum through outlet connection 7.

Mounted on the base within the vessel is a support 8 secured to a metal body, preferably a tube 9. Applied to the tube 9 is a sleeve or envelope 10 of earthen material of a refractory or other nature. This material may be in a raw or plastic state when it is applied to the metal and mounted in the container.

When the container has been evacuated to a suitable extent, the vessel may be placed in a furnace 11 and heated until the earthen envelope has been baked onto the metal tube or sleeve. Heating in the furnace may be effected by means of a high frequency coil inductively disposed with respect to the metal tube, or any other suitable method may be resorted to.

The particular advantage of the invention is that the earthen material is baked or fired onto the metal under conditions which preclude oxidation and which binds the envelope material more intimately to the metal, drives out contained gases, and thereby makes the envelope less porous.

The article produced by the invention is adapted for use in various electrical devices where the article may be permanently mounted in the vessel, or may be removed therefrom. Material fired or baked on in this manner is less likely to separate from the metal or cake-off than materials baked on in the usual fashion.

I claim as my invention:

1. A method of baking an earthen envelope on a metal article which consists in forming an envelope on the metal article, mounting the article in a vessel, pumping air out of the vessel, and then baking the earthen envelope on the article in the vessel while the vacuum is maintained.

2. A method of baking an earthen or the like envelope on a metal tube which consists in forming an evelope of plastic material about the metal tube, placing the tube on a vessel, exhausting the vessel, and maintaining a vacuum in the vessel while the envelope is baked onto the metal.

3. A method as defined by claim 1 wherein the baking is effected by maintaining the metal article in inductive relation with a high frequency inductive field.

4. A method of making a composite article of metal and ceramic material which consists in joining the metal and ceramic material, and then baking the composite article in a vacuum.

5. A method of binding an earthen material onto a metal member, consisting of placing the said material upon the said member and then including the same in an exhaustion vessel, and maintaining a vacuum in a vessel while the earthen material is baked onto the metal member.

6. A method of binding an earthen material upon a metal member which consists in forming the earthen material upon the metal member and placing the same in a vessel, exhausting the vessel, and maintaining a vacuum in the vessel while the earthen material is baked onto the metal member.

7. A method of binding an earthen material upon a metal member which consists in forming the earthen material upon the metal member and placing the same in a vessel, exhausting the vessel and maintaining a vacuum in the vessel while the earthen material is baked onto the metal member, thereby preventing oxidation of the metal and securing a fine texture of the earthen material.

In testimony whereof I have hereunto set my hand.

FREDERICK S. McCULLOUGH.